US012793523B2

(12) United States Patent
Ikezawa et al.

(10) Patent No.: US 12,793,523 B2
(45) Date of Patent: Nov. 10, 2026

(54) STORE EXIT MANAGEMENT SYSTEM, STORE EXIT MANAGEMENT METHOD, AND RECORDING MEDIUM

(71) Applicant: NEC Corporation, Tokyo (JP)

(72) Inventors: Rumi Ikezawa, Tokyo (JP); Tadamasa Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/728,906

(22) PCT Filed: Jan. 28, 2022

(86) PCT No.: PCT/JP2022/003284

§ 371 (c)(1),
(2) Date: Jul. 15, 2024

(87) PCT Pub. No.: WO2023/144992

PCT Pub. Date: Aug. 3, 2023

(65) Prior Publication Data

US 2025/0095464 A1 Mar. 20, 2025

(51) Int. Cl.
*G08B 13/196* (2006.01)
*G06Q 20/20* (2012.01)
(Continued)

(52) U.S. Cl.
CPC .......... *G08B 13/196* (2013.01); *G06Q 20/20* (2013.01); *G06Q 20/3274* (2013.01); (Continued)

(58) Field of Classification Search
None
See application file for complete search history.

(56) References Cited

U.S. PATENT DOCUMENTS 11,989,763 B1 * 5/2024 Milojevic ................ G07G 3/00
2014/0164175 A1 6/2014 Kitlyar
(Continued)

FOREIGN PATENT DOCUMENTS

JP 2013-242857 A 12/2013
JP 2015-099441 A 5/2015
(Continued)

OTHER PUBLICATIONS

International Search Report for PCT Application No. PCT/JP2022/003284, mailed on May 10, 2022.
(Continued)

*Primary Examiner* — Heather R Jones
(74) *Attorney, Agent, or Firm* — Sughrue Mion, PLLC

(57) ABSTRACT

A store exit management system according to an aspect of the present disclosure includes: at least one memory configured to store instructions; and at least one processor configured to execute the instructions to: acquire a payment completion code from a portable terminal operated by a customer when a product was registered and paid for through the portable terminal; acquire a quantity of a payment completion product associated with the payment completion code; estimate, from an image obtained by imaging goods of the customer leaving a store, a quantity of a product to be taken out by the customer; detect an abnormality based on the acquired quantity of the payment completion product and the estimated quantity of the product to be taken out; and output information indicating that the abnormality is detected.

18 Claims, 11 Drawing Sheets

(51) Int. Cl.

| | |
|---|---|
| ***G06Q 20/32*** | (2012.01) |
| ***G06V 20/52*** | (2022.01) |
| ***G06V 40/10*** | (2022.01) |
| ***G07C 9/15*** | (2020.01) |
| ***G07G 1/01*** | (2006.01) |

(52) U.S. Cl.
CPC .............. *G06V 20/52* (2022.01); *G06V 40/10* (2022.01); *G07C 9/15* (2020.01); *G07G 1/01* (2013.01)

(56) References Cited

U.S. PATENT DOCUMENTS

| | | | | |
|---|---|---|---|---|
| 2017/0309136 | A1* | 10/2017 | Schoner | G06Q 10/087 |
| 2021/0287013 | A1* | 9/2021 | Carter | H04N 7/181 |
| 2023/0004978 | A1* | 1/2023 | Brakob | G06Q 20/4016 |

FOREIGN PATENT DOCUMENTS

| | | | |
|---|---|---|---|
| JP | 2019-086832 | A | 6/2019 |
| JP | 2019-153157 | A | 9/2019 |
| JP | 2020-038420 | A | 3/2020 |
| JP | 2021-125160 | A | 8/2021 |
| JP | 2025-038150 | A | 3/2025 |

OTHER PUBLICATIONS

English translation of Written opinion for PCT Application No. PCT/JP2022/003284, mailed on May 10, 2022.
JP Office Communication for JP Application No. 2024-221871, mailed on Jun. 17, 2025 with English Translation.
Japanese Office Action for JP Application No. 2025-116967, mailed on Apr. 21, 2026 with English Translation.

* cited by examiner

Fig.5
2:34 PM
100%
STORE EXIT PROCESS
PLACE STORE EXIT CODE
OVER GATE
THANK YOU FOR USING
SMARTPHONE REGISTER
END

STORE EXIT MANAGEMENT SYSTEM, STORE EXIT MANAGEMENT METHOD, AND RECORDING MEDIUM

This application is a National Stage Entry of PCT/JP2022/003284 filed on Jan. 28, 2022, the contents of all of which are incorporated herein by reference, in their entirety.

TECHNICAL FIELD

The present disclosure relates to a store exit management system and the like.

BACKGROUND ART

There is a store that performs product registration and makes a payment by a customer's operation on a terminal. In such a store gate or counter, the customer may be caused to scan the terminal to manage the customer's leaving of the store.

PTL 1 discloses a system in which a customer registers a product using a portable terminal. In PTL 1, when the terminal is returned to the management device of the terminal, the settlement process for the price of the registered product is performed.

CITATION LIST

Patent Literature

PTL 1: JP 2015-099441 A

SUMMARY OF INVENTION

Technical Problem

In a case where products are registered and paid for by the operation by the customer, there may be a difference between the quantity of the registered and paid-for product and the quantity of the product to be taken out. For example, a difference occurs in a case where a customer takes out a product without paying or in a case where the customer forgets the product that has been paid for in the store. When such a difference occurs, it is preferable for the customer and the store clerk to take measures.

An object of the present disclosure is to provide a store exit management system and the like that can support handling of an abnormality that has occurred with respect to a product to be taken out by a customer who leaves a store when a product is registered and paid for via a portable terminal operated by the customer.

Solution to Problem

A store exit management system according to the present disclosure includes a code acquisition means for acquiring a payment completion code from a portable terminal operated by a customer when a product was registered and paid for through the portable terminal, a paid-for product information acquisition means for acquiring a quantity of a payment completion product associated with the payment completion code, an estimation means for estimating, from an image obtained by imaging goods of the customer leaving a store, a quantity of a product to be taken out by the customer, an abnormality detection means for detecting an abnormality based on the acquired quantity of the payment completion product and the estimated quantity of the product to be taken out, and an abnormality output means for outputting information indicating that the abnormality is detected.

A store exit management method according to the present disclosure includes acquiring a payment completion code from a portable terminal operated by a customer when a product was registered and paid for through the portable terminal, acquiring a quantity of a payment completion product associated with the payment completion code, estimating, from an image obtained by imaging goods of the customer leaving a store, a quantity of a product to be taken out by the customer, detecting an abnormality based on the acquired quantity of the payment completion product and the estimated quantity of the product to be taken out, and outputting information indicating that the abnormality is detected.

A program according to the present disclosure causes a computer to execute the steps of acquiring a payment completion code from a portable terminal operated by a customer when a product was registered and paid for through the portable terminal, acquiring a quantity of a payment completion product associated with the payment completion code, estimating, from an image obtained by imaging goods of the customer leaving a store, a quantity of a product to be taken out by the customer, detecting an abnormality based on the acquired quantity of the payment completion product and the estimated quantity of the product to be taken out, and outputting information indicating that the abnormality is detected. The program may be stored in a non-transitory computer-readable recording medium.

Advantageous Effects of Invention

According to the present disclosure, in a case where a product is registered and paid for via a portable terminal operated by a customer, it is possible to support handling of an abnormality related to the product to be taken out by the customer leaving the store.

EXAMPLE EMBODIMENT

Hereinafter, example embodiments of a store exit management system, a store exit management method, a program, and a recording medium that non-transiently records the program according to the present disclosure will be described with reference to the drawings. The present example embodiment does not limit the disclosed technology.

First Example Embodiment

Figure 1:
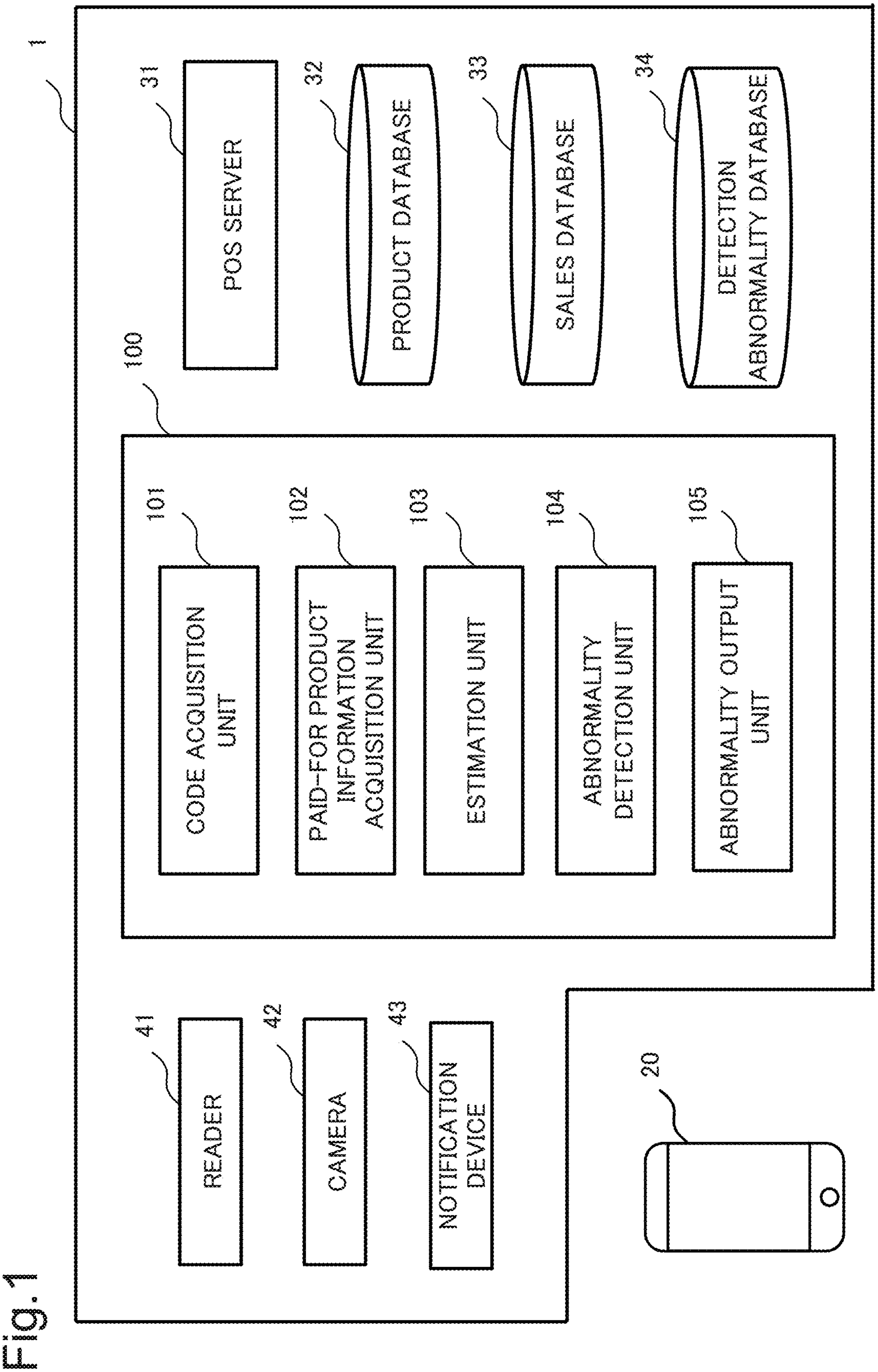
FIG. 1 is a block diagram illustrating a configuration example of a store system according to the first example embodiment.

A store exit management system 100 according to the first example embodiment is a system that manages the quantity of the product to be taken out by a customer when leaving a store and the quantity of the product paid for by the customer. The store exit management system 100 is used as a store system 1. FIG. 1 is a block diagram illustrating a configuration example of the store system I according to the first example embodiment. The store exit management system 100 includes a code acquisition unit 101, a paid-for product information acquisition unit 102, an estimation unit 103, an abnormality detection unit 104, and an abnormality output unit 105.

The store system 1 includes a point of sales (POS) server 31, a product database 32, and a sales database 33 in addition to the store exit management system 100. The store exit management system 100, the POS server 31, the product database 32, and the sales database 33 are communicably connected in a wired or wireless manner appropriately according to a specific configuration of each system. The POS server 31 is communicably connected to a portable terminal 20 in a wired or wireless manner. The portable terminal 20 is a terminal operated by a customer.

The POS server 31 manages, for example, various pieces of information about a product to be sold in a store. The POS server 31 may be an application server. In addition to the portable terminal 20, the POS server 31 may also manage registration and payment for a product using another terminal other than the portable terminal 20, such as a POS terminal operated by a store clerk. That is, in the store, the existing POS terminal and the portable terminal 20 may be usable for product registration and payment.

The POS server 31 transmits the payment completion code to the portable terminal 20. The transmitted payment completion code is held in the portable terminal 20. The payment completion code is not particularly limited as long as it indicates that the customer has completed the payment. The payment completion code is associated with information about the payment. The information about the payment includes, for example, the number of payment completion products, the identification information about the payment completion products, or the total amount. The payment completion code is also referred to as a store exit code because the payment completion code is used when the customer leaves the store.

For example, a payment identifier (ID) may be used as the payment completion code. The payment ID uniquely identifies each payment. A transaction ID or a customer ID may be used as the payment completion code. The transaction ID uniquely identifies each transaction from the start of the product registration processing to the completion of payment as one transaction. The customer ID uniquely identifies the customer. The transaction ID and the customer ID can be used as a payment completion code by being associated with, for example, information indicating that payment is completed.

The product database 32 stores product identification information and product information for each product in association with each other. For example, when the product identification information is a product code, the product information is information such as the name of the product and the price of the product. The product information is not particularly limited.

The sales database 33 stores, for example, information about sales for each store. The sales database 33 manages information about each payment for each store, for example. The sales database 33 may store information related to each payment in association with a payment completion code.

The store system I includes a reader 41 and a camera 42. A plurality of readers 41 and a plurality of cameras 42 may be provided. The reader 41 and the camera 42 are installed in a store. However, the camera 42 may be achieved by a camera included in the portable terminal 20. The store exit management system 100 is communicably connected to the reader 41 and the camera 42 in a wired or wireless manner.

The reader 41 reads the payment completion code from the portable terminal 20. A method by which the reader 41 reads the payment completion code is not particularly limited. For example, the reader 41 may read a barcode or a two-dimensional code obtained by encoding the payment completion code displayed on the display of the portable terminal 20. Alternatively, the reader 41 may receive the payment completion code from the portable terminal 20 by wireless communication such as near field communication (NFC), Wi-Fi (registered trademark), or Bluetooth (registered trademark). The reader 41 transmits the read payment completion code to the code acquisition unit 101 of the store exit management system 100.

The camera 42 images a customer's goods. Then, the camera 42 transmits the captured image to the store exit management system 100.

The goods are at least one object carried by the customer. The camera 42 may image goods placed in front of the camera 42. Alternatively, the camera 42 may image goods carried by a customer by imaging the customer carrying the goods.

The camera 42 captures, for example, an image of goods of a customer leaving the store. In this case, the camera 42 may be installed near the exit of the store.

Figure 2:
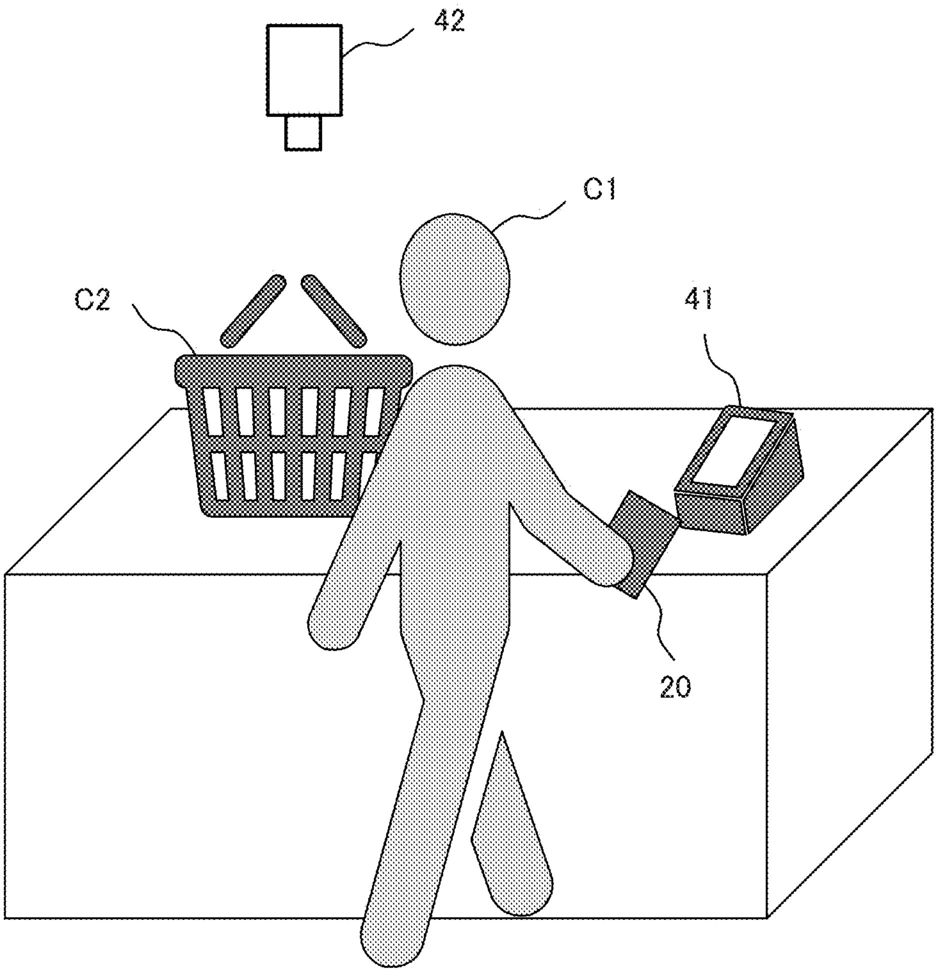
FIG. 2 is a schematic diagram illustrating an installation example of a reader and a camera.

FIG. 2 is a schematic diagram illustrating an installation example of the reader 41 and the camera 42. The reader 41 is installed, for example, on a counter. For example, the camera 42 is installed in such a way as to be able to image goods placed on the counter from above the counter. For example, a customer C1 places goods C2 on the counter before leaving the store, and causes the reader 41 to read the payment completion code displayed on the portable terminal 20. The customer C1 leaves the store after causing the reader 41 to read the payment completion code.

Figure 3:
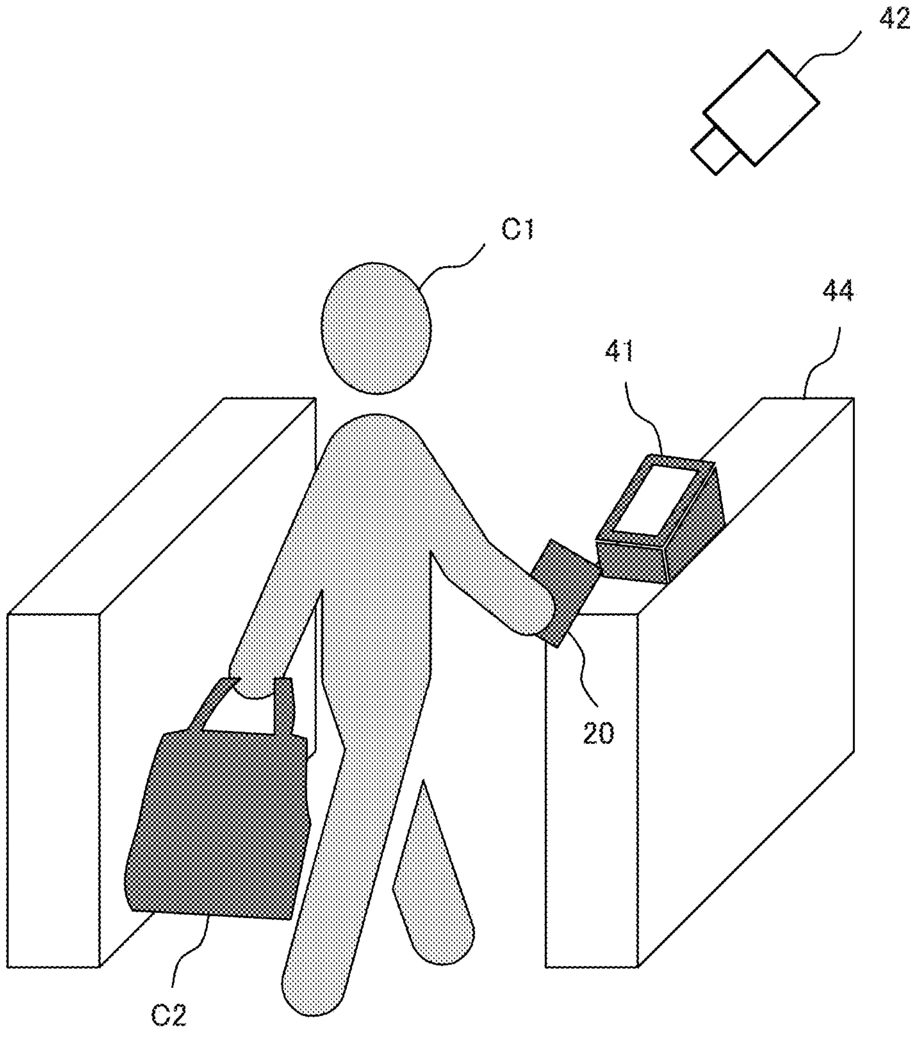
FIG. 3 is a schematic diagram illustrating another installation example of a reader and a camera.

FIG. 3 is a schematic diagram illustrating another installation example of the reader 41 and the camera 42. The reader 41 is installed, for example, at the store exit gate 44. The store exit gate 44 is a gate through which a customer leaving the store passes. When the payment completion code is presented, the store exit gate 44 is set to a state in which the customer is allows to pass through. The camera 42 is installed in such a way as to be able to image, for example, a customer passing through the store exit gate 44. For example, the customer C1 holds goods C2 and causes the reader 41 to read the payment completion code displayed on the portable terminal 20. The customer C1 passes through the store exit gate 44 after the payment completion code is read.

The installation examples of the reader 41 and the camera 42 are not limited to the above examples. The reader 41 and the camera 42 may be provided at different places in the store. That is, reading of the payment completion code and capturing of the image may be performed at different places.

In the first example embodiment, a case where the store system 1 further includes a detection abnormality database 34 and a notification device 43 will be described. The store system I may not include the detection abnormality database 34 and the notification device 43. The store exit management system 100 is communicably connected to the detection abnormality database 34 and the notification device 43.

The detection abnormality database 34 stores an abnormality detected by the store exit management system 100. The notification device 43 may make a notification of the detected abnormality in response to a request from the store administrator with reference to the detection abnormality database 34.

The notification device 43 makes a notification of the abnormality detected by the store exit management system 100. The notification device 43 is, for example, a display, a speaker, or a lamp. A plurality of notification devices 43 may be provided in the store. The notification device 43 may notify the customer leaving the store of the abnormality. The notification device 43 may notify the store clerk of the abnormality. In this case, the notification device 43 may be a terminal operated by a store clerk.

The notification device 43 may be provided at a counter on which the reader 41 is installed. The notification device 43 may be provided at the store exit gate 44 as illustrated in FIG. 3. By providing the notification device 43 near the reader 41, the notification device 43 can notify a customer who leaves the store of the abnormality with respect to the abnormality. The notification device 43 can notify a store clerk near a customer who leaves the store and another customer of the abnormality.

The store exit management system 100, the POS server 31, and each database according to the store system I may be installed, for example, in the backyard of the store, but the installation location is not particularly limited. Part of the devices constituting the store system 1 may be achieved by a cloud server.

Each system including the store exit management system 100, the POS server 31, and each database according to the store system I may be achieved by separate information processing devices. Alternatively, the function of each system may be implemented by a single information processing device. For example, each database according to the store system 1 may be included in the information processing device that implements the POS server 31. Each system may be implemented by a combination of a plurality of information processing devices.

The portable terminal 20 is, for example, a mobile terminal such as a smartphone or a tablet. The type of the portable terminal 20 is not particularly limited. The portable terminal 20 may be owned by a customer or may be lent out by a store. The portable terminal 20 may be attached to a shopping basket or a shopping cart, or may be provided integrally with the shopping basket or the shopping cart. In a case where the portable terminal 20 is attached to a shopping cart, the shopping cart may be self-propelled by including, for example, a movable unit such as a tire and a drive device such as a motor.

Figure 4:
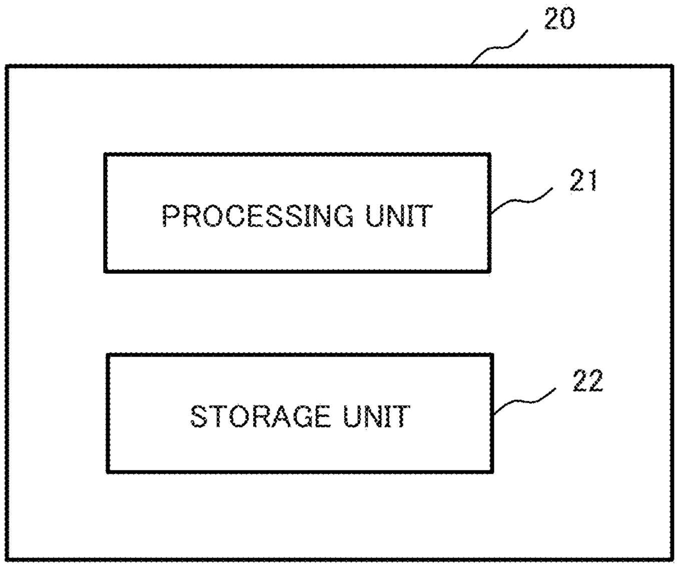
FIG. 4 is a block diagram illustrating a configuration example of a portable terminal 20.

FIG. 4 is a block diagram illustrating a configuration example of the portable terminal 20. The portable terminal 20 includes a processing unit 21 and a storage unit 22. The following functions of the processing unit 21 may be implemented by installing an application program in the storage unit 22. The processing unit 21 may not have some of the functions described below.

Hereinafter, configurations of the store system 1 and the portable terminal 20 will be described in more detail.

<Input of Identification Information>

The processing unit 21 of the portable terminal 20 receives an input of product identification information. The POS server 31 may display a screen for receiving the input of the identification information.

The processing unit 21 receives an input of product identification information via a camera (not illustrated), for example. The camera is not particularly limited, but is, for example, a camera included in the portable terminal 20. The processing unit 21 may receive the input of the identification information by reading the one-dimensional code or the two-dimensional code of the product captured by the imaging device. The processing unit 21 may receive the input of the identification information by identifying the product using the image recognition technique from the image of the product captured by the imaging device.

The processing unit 21 may acquire the identification information by reading a tag to which a radio frequency identifier (RFID) is attached via a reading device. When RFID is used, the reading device is an RFID reader.

The processing unit 21 may receive the identification information about the product by receiving the selection of the product from the result of the product search. For example, a product search method is not particularly limited. The product search may be performed by characters or images. For example, the processing unit 21 may receive the input of the identification information by receiving the selection of the product from the displayed image of the product.

The processing unit 21 may receive an input of identification information by receiving an input of a number such as a product code via an input device (not illustrated). Examples of the input device include a touch panel display and a keyboard capable of inputting numbers and characters.

The processing unit 21 of the portable terminal 20 transmits the identification information about the product received as described above to the POS server 31. For the product registered by transmitting the identification information, the processing unit 21 may display the product information under the control of the POS server 31.

<Registration of Product>

The POS server 31 registers the product based on the identification information received from the portable terminal 20. The POS server 31 refers to the product database 32 and acquires product information. Then, the POS server 31 registers the product to be purchased by the customer using the acquired information about the product. For example, the POS server 31 generates a registered product list for each customer as processing of registering a product.

<Payment Process>

Further, the processing unit 21 of the portable terminal 20 executes a process related to the payment for the registered product. Hereinafter, a case where the payment is made via a settlement server and a case where the payment is made using a payment device installed in a store will be described. However, the payment method is not limited thereto.

In a case where the payment is made via the settlement server, the processing unit 21 of the portable terminal 20 may communicate with a settlement server (not illustrated) as processing related to the payment and instruct the settlement server to perform the payment. For example, the processing unit 21 transmits the payment instruction including the settlement information and the payment information to the settlement server. The settlement information is information for identifying a customer's credit card, debit card, electronic money, point, or the like. The payment information is information for identifying the registered product or the purchase amount of the registered product. The settlement server makes a cashless payment using the settlement information and the payment information. For example, the settlement server notifies the portable terminal 20 and the POS server 31 of the completion of the payment.

The processing unit 21 of the portable terminal 20 may instruct the payment to the settlement server via the POS server 31 or the store exit management system 100. Part or all of the functions of the settlement server may be implemented by the store exit management system 100 or the POS server 31.

Alternatively, in a case where the payment is made using the payment device installed in the store, the processing unit 21 of the portable terminal 20 may output information identifying the payment information to the payment device as processing related to the payment. The POS server 31 stores the information for identifying the payment information in association with the payment information, for example. The payment device acquires the payment information from, for example, the POS server 31 based on the information identifying the output payment information. The payment device executes a payment process by an any method such as the cash payment or the cashless payment based on the acquired payment information. For example, the payment device notifies the portable terminal 20 and the POS server 31 of completion of the payment.

A method of outputting information for identifying the payment information to the payment device is not particularly limited. For example, the processing unit 21 may display, on the display of the portable terminal 20, a barcode or a two-dimensional code obtained by encoding information for identifying the payment information. The payment device reads information identifying the payment information displayed on the display. Alternatively, the processing unit 21 may transmit, to the payment device, information identifying the payment information by wireless communication such as near field communication (NFC), Wi-Fi (registered trademark), or Bluetooth (registered trademark).

The processing unit 21 may output payment information to the payment device as processing related to the payment. In this case, the payment device acquires the payment information from the portable terminal 20.

The POS server 31 stores information about the payment in the sales database 33. The POS server 31 transmits the payment completion code to the portable terminal 20 after completion of the payment.

<Detection of Abnormality>

When the product is registered and paid for via the portable terminal 20, the code acquisition unit 101 of the store exit management system 100 acquires the payment completion code from the portable terminal 20.

The code acquisition unit 101 of the store exit management system 100 acquires the payment completion code from the portable terminal 20 via the reader 41. In this case, the processing unit 21 of the portable terminal 20 first outputs the payment completion code.

For example, the processing unit 21 transmits the payment completion code to the reader 41 by wireless communication.

Figure 5:
FIG. 5 is a diagram illustrating an example of a display screen of a payment completion code.

Alternatively, the processing unit 21 displays the barcode or the two-dimensional code obtained by encoding the payment completion code on the display of the portable terminal 20. FIG. 5 is a diagram illustrating an example of a display screen of a payment completion code displayed on the portable terminal 20. The two-dimensional code obtained by encoding the payment completion code is displayed on the display screen of FIG. 5. The customer causes the reader 41 to read the barcode displayed on the portable terminal 20 before leaving the store.

Then, the code acquisition unit 101 acquires the read payment completion code from the reader 41.

The paid-for product information acquisition unit 102 acquires the quantity of the payment completion product associated with the payment completion code. For example, the paid-for product information acquisition unit 102 refers to the sales database 33 and acquires the quantity of the payment completion product associated with the payment completion code.

The quantity of the payment completion product may be the number of payment completion products. The quantity of the payment completion product may be the volume of the payment completion product. For example, the paid-for product information acquisition unit 102 may estimate the volume of the product from the number of payment completion products. Alternatively, the paid-for product information acquisition unit 102 may refer to the volume of the product stored in the product database 32 and acquire the volume of the payment completion product.

The estimation unit 103 estimates the quantity of the product to be taken out by the customer from the image obtained by imaging the goods of the customer leaving the store. The quantity of the product to be taken out may be the number of the products to be taken out. The quantity of the product to be taken out may be the volume of the product to be taken out.

Hereinafter, a method of estimating the quantity of the product to be taken out will be described.

For example, the estimation unit 103 acquires, from the camera 42, an image obtained by imaging goods of a customer who leaves the store. The estimation unit 103 recognizes goods from the acquired image. The estimation unit 103 may recognize a product as goods. The estimation unit 103 may recognize the product in the container from the image obtained by imaging the inside of the container. The container into which the product is put is, for example, a bag, a paper bag, a plastic bag, cardboard, or a shopping basket. The estimation unit 103 may estimate the recognized quantity of the product as the quantity of the product to be taken out.

When the products are in a container, it may be difficult to recognize all products. For example, in a case where an image obtained by capturing a customer's goods are captured from the outside of the container, the product in the container may not be visible. Therefore, the estimation unit 103 may recognize the container as the goods. Then, the estimation unit 103 may recognize the volume of the container using an existing technology related to the measurement of the size based on the image. In a case where a customer puts a product into a container whose volume is known, the estimation unit 103 may recognize the volume of the container by recognizing the type of the container. The estimation unit 103 may estimate the volume of the container thus recognized as the quantity of the product to be taken out.

As an example, the plastic bag may have a larger volume as the product is put therein. Therefore, it is possible to estimate the volume of the plastic bag as the volume of the product put in the plastic bag.

A customer may not fill a container with goods. Therefore, the estimation unit 103 may estimate the quantity of the product in the container as the quantity of the product to be taken out.

The estimation unit 103 may estimate the quantity of the product in the container by using the ratio of the product in the volume of the container. The estimation unit 103 may recognize the volume of the container by using an existing technology related to size measurement based on an image. In a case where a customer puts a product into a container whose volume is known, the estimation unit 103 may recognize the volume of the container by recognizing the type of the container. Then, for example, the estimation unit 103 recognizes the position of the uppermost layer product in the container from the image. Furthermore, the estimation unit 103 recognizes the bottom and the upper end of the container from the image. Then, the estimation unit 103 calculates the ratio of the product in the volume of the container by dividing the height from the bottom of the container to the position of the uppermost layer product by the height of the container. The estimation unit 103 may estimate the volume obtained by multiplying the volume of the container by the ratio of the product as the quantity of the product in the container.

The estimation unit 103 may estimate the quantity of the products in the container by using the quantity of the uppermost layer product in the container and the number of layers of the products in the container. For example, the estimation unit 103 recognizes the uppermost layer product in the container from an image obtained by imaging the inside of the container from above. The estimation unit 103 recognizes the position of the uppermost layer product in the container and the position of the bottom of the container from the image. Furthermore, the estimation unit 103 estimates the number of layers of products in the container from the height from the bottom of the container to the uppermost layer product. Then, the estimation unit 103 may estimate a value obtained by multiplying the quantity of the surface layer product by the estimated number of layers of products as the total quantity of the products in the container.

As an example, it is assumed that the customer puts the payment completion product in the shopping basket and takes out the product from the store. When the volume of the shopping basket is known, the estimation unit 103 can estimate the volume of the product in the container according to the position of the uppermost layer product of the shopping basket.

The estimation unit 103 may estimate the number of the products to be taken out from the volume of the products to be taken out. For example, the estimation unit 103 may estimate the number of the products to be taken out by dividing the result of estimating the volume of the products to be taken out by the average volume of the product.

Furthermore, the estimation unit 103 may estimate the quantity of the product to be taken out from the image obtained by imaging the goods of the customer leaving the store and the image obtained by imaging the goods of the customer before holding the product to be taken out.

For example, the camera 42 images an image obtained by imaging the goods of the customer before holding the product to be taken out. The camera 42 that captures an image before the customer holds the product can be installed near an entrance of a store, for example. The estimation unit 103 acquires the image from the camera 42.

For example, the estimation unit 103 recognizes a customer's goods for each of the images and estimates the volume of the recognized goods. The estimation unit 103 may estimate a volume obtained by removing the volume of the goods recognized for the customer before holding the product from the volume of the goods recognized for the customer who leaves the store as the quantity of the product to be taken out.

As an example, there is a case where a customer puts a payment completion product in a bag brought by the customer. The bag may contain an article that the customer brings into the store from outside the store. For example, near the entrance, the camera 42 transmits an image obtained by imaging the bag before the customer puts the product to the estimation unit 103. Near the exit, the camera 42 transmits an image obtained by imaging the bag after the customer puts the product to the estimation unit 103. Then, the estimation unit 103 may calculate the volume of the bag from each image and estimate the quantity of the product to be taken out.

For example, the customer may perform registration in which bag the product is to be put before holding the product in the store. The customer may register the bag by causing the camera 42 to image the brought bag.

The estimation unit 103 may perform object recognition for each of goods included in the image. Then, for example, the estimation unit 103 may recognize, as the product to be taken out, an object obtained by excluding objects recognized in the image of the goods before the customer holds the product in the store from objects recognized in the image of the goods of the customer leaving the store.

The method of estimating the quantity of the product to be taken out is described above. The methods described above may be used in combination. The method of estimating the product to be taken out is not limited to the above example.

The customer's goods may be recognized by the camera 42. The camera 42 may transmit the recognized result to the store exit management system 100. The estimation unit 103 acquires a result of recognizing the customer's goods from the camera 42.

The abnormality detection unit 104 detects an abnormality based on the quantity of the payment completion product acquired by the paid-for product information acquisition unit 102 and the quantity of the product to be taken outs estimated by the estimation unit 103. The abnormality includes a case where there is a difference between the quantity of the payment completion product and the quantity of the product to be taken out. For example, when the quantity of the product to be taken out is larger than the quantity of the payment completion product, there is a possibility that payment incompletion products are illegally taken out by the customer. In a case where the quantity of the product to be taken out is smaller than the quantity of the payment completion product, there is a possibility that the customer mislays the payment completion product in the store. Therefore, the abnormality detection unit 104 detects an abnormality based on a difference between the quantity of the payment completion product and the quantity of the product to be taken out.

The abnormality detection unit 104 may detect an abnormality in a case where the quantity of the product to be taken out estimated by the estimation unit 103 is larger than the quantity of the payment completion product acquired by the paid-for product information acquisition unit 102. That is, the abnormality detection unit 104 may detect an abnormality in a case where it is estimated that there is a product that has not been paid for among the products to be taken out.

The abnormality detection unit 104 may detect an abnormality in a case where the quantity of the product to be taken out estimated by the estimation unit 103 is smaller than the quantity of the payment completion product acquired by the paid-for product information acquisition unit 102. That is, the abnormality detection unit 104 may detect an abnormality, for example, in a case where it is estimated that there is a product mislaid in the store even though the payment has been performed.

In a case where the abnormality detection unit 104 detects an abnormality, a threshold value may be set for a difference between the quantity of the payment completion product and the quantity of the product to be taken out. For example, the abnormality detection unit 104 may detect an abnormality in a case where a difference between the quantity of the product to be taken out and the quantity of the payment completion product exceeds a threshold value. By setting the threshold value, the number of detected abnormalities can be suppressed.

The threshold value may be set according to the estimation accuracy of the quantity of the product to be taken out. In a case where the difference between the quantity of the product to be taken out and the quantity of the payment completion product is small, the abnormality detection unit 104 may erroneously detect an abnormality. Therefore, for example, in a case where the estimation accuracy of the estimation unit 103 is low, the threshold value can be set high. In a case where the difference does not exceed the threshold value, the abnormality detection unit 104 may determine that it is an error in estimation.

The threshold value may be set according to the product paid for by the customer. Depending on the product, it may be difficult to recognize the volume from the image, and the estimation accuracy by the estimation unit 103 may decrease. Therefore, in a case where a product of which it is difficult to recognize the volume from the image is included in the product paid for by the customer, the threshold value can be set high.

The threshold value may be set according to the amount of the product paid for by the customer. For example, the threshold value may be set low when the payment amount is high. As a result, the abnormality detection unit 104 detects an abnormality even if the difference in the quantity of the product is small for a customer for which the payment amount is high. Therefore, in a case where there is a possibility that a customer who has purchased expensive goods has mislaid an expensive payment completion product in the store, the abnormality detection unit 104 can appropriately detect an abnormality. Alternatively, the threshold value may be set low when the payment amount is low. As a result, for the customer who may set a lower payment amount by performing the payment with the quantity smaller than the quantity of the product to be actually taken out, the abnormality can be appropriately detected even if the difference in the quantity of the product is small.

The threshold value may be set according to the degree of congestion. The congestion degree may be a congestion degree in real time or a congestion degree predicted for each time zone. For example, in a case where the store is crowded, the threshold value may be set high. This makes it difficult to detect an abnormality, so that further congestion due to confirmation of an abnormality can be prevented. Alternatively, the threshold value may be set low when the store is crowded. As a result, since an abnormality is easily detected, it is possible to prevent a product for which payment is not completed from being taken out under cover of congestion.

The threshold value may be set according to the customer. For example, the threshold value may be set low for a customer for which abnormality has been detected in the past. As a result, an abnormality can be detected for a customer who is highly likely to perform fraud.

The abnormality detection unit 104 may notify the abnormality output unit 105 of a difference between the quantity of the payment completion product and the estimated quantity of the product to be taken out as the degree of abnormality.

<Notification of Abnormality>

The abnormality output unit 105 outputs information indicating that an abnormality is detected. For example, the abnormality output unit 105 may output information indicating that an abnormality is detected to the notification device 43 and cause the notification device 43 to make a notification of the abnormality. The abnormality output unit 105 may output information indicating that an abnormality is detected to the detection abnormality database 34 and store the detected abnormality in the database.

Since the detected abnormality is stored in the detection abnormality database 34, the store administrator can confirm the abnormality even after the customer leaves the store. Then, the administrator may carefully observe the customer when the customer visits the store next time.

The abnormality output unit 105 may cause the notification device 43 to output an alarm sound or an alarm display.

Alternatively, as the detection of the abnormality, the abnormality output unit 105 may cause the notification device 43 to make a notification of the number of the payment completion products by voice or display. That is, in a case where no abnormality is detected, the abnormality output unit 105 does not cause the notification device 43 to make a notification of the number of payment completion products. Therefore, the clerk or the customer can determine whether an abnormality has been detected based on the presence of absence of the notification of the number of payment completion products. The abnormality output unit 105 can acquire the number of payment completion products from, for example, the abnormality detection unit 104, the paid-for product information acquisition unit 102, or the sales database 33. Instead of the number of payment completion products, other information related to the payment completion product may be used.

The abnormality output unit 105 may change the notification device 43 from which the notification is output based on the difference between the quantity of the product to be taken out and the quantity of the payment completion product. For example, in a case where the quantity of the product to be taken out is larger than the quantity of the payment completion product, the abnormality output unit 105 may cause the notification device 43 for the clerk to make a notification that the abnormality is detected. As a result, for example, the store clerk can check the customer's goods as to whether there is a product to be illegally taken out. In a case where the quantity of the product to be taken out is smaller than the quantity of the payment completion product, the abnormality output unit 105 may cause the notification device 43 for the customer to make a notification that the abnormality is detected. As a result, for example, the customer can check whether there is a product mislaid in the store.

The abnormality output unit 105 may output information indicating that an abnormality has been detected according to the degree of the detected abnormality.

As an example, the abnormality output unit 105 may change the notification level in the notification device 43 according to the difference between the quantity of the payment completion product and the estimated quantity of the product to be taken out. For example, in a case where the difference is large, the abnormality output unit 105 causes the notification device 43 to make a notification at a level higher than that in a case where the difference is small. The notification at a high level is a notification that attracts more attention.

In a case where the difference is small, there is a possibility that an abnormality is erroneously detected, and thus, a low-level notification may be performed. In a case where the difference is large, there is a high possibility that an abnormality has occurred, so that a high level of notification may be performed. In a case where the difference is large, there is a possibility that more products are taken out without being paid for, or there is a possibility that more payment completion products are left in the shop. Therefore, a high level notification conveying the higher level of urgency is ed may be made.

In a case where the notification device 43 is a speaker, the abnormality output unit 105 may cause the speaker to output a short notification sound, for example, in a case where the difference is small. Then, the abnormality output unit 105 may cause the speaker to output the alarm sound when the difference is large. When the notification device 43 is a display, for example, the abnormality output unit 105 may display the abnormality in yellow when the difference is small, and may display the abnormality in red when the difference is large.

Figure 6:
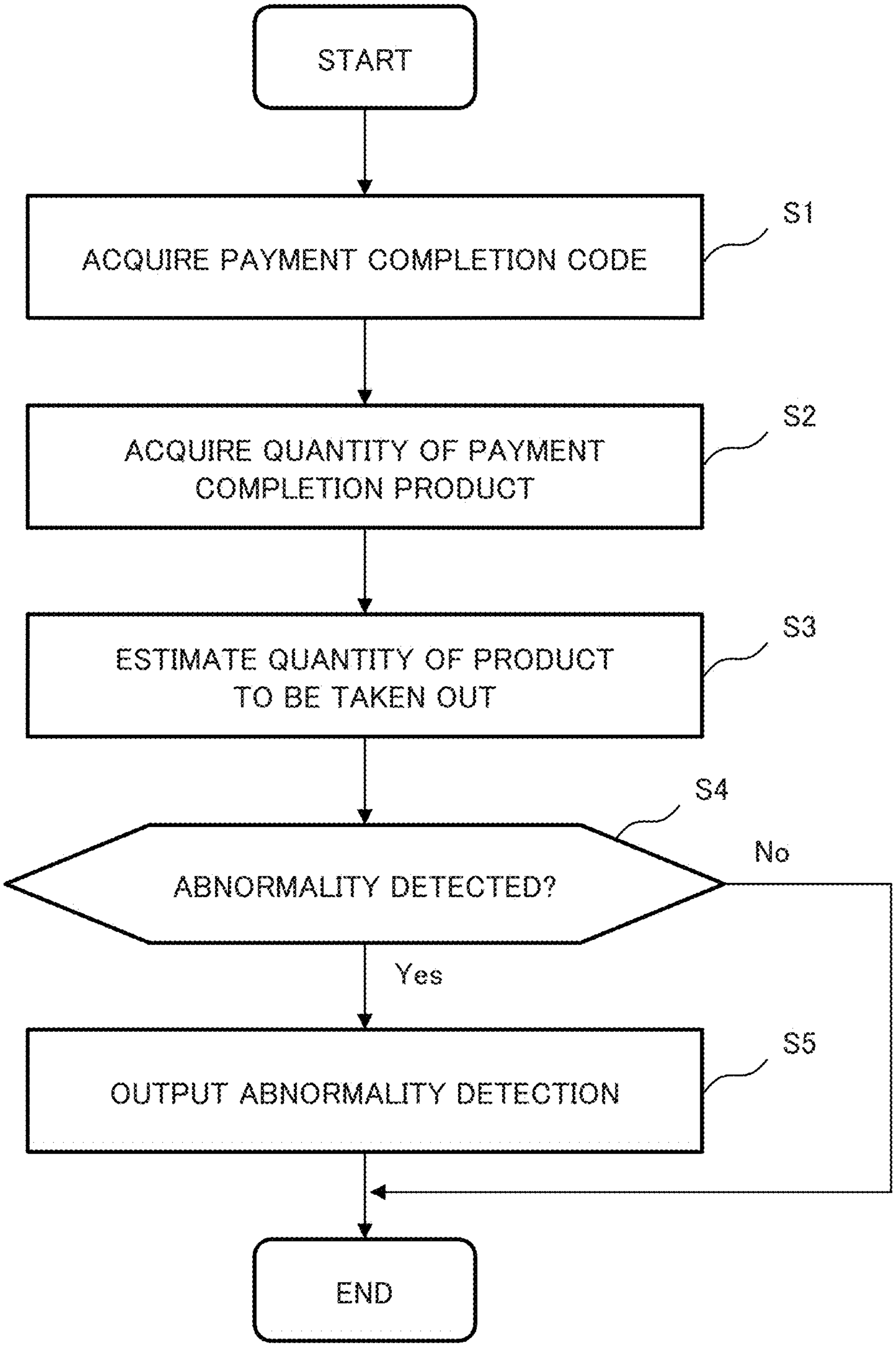
FIG. 6 is a flowchart illustrating an operation example according to the first example embodiment.

Next, the operation of the store exit management system 100 will be described. FIG. 6 is a flowchart illustrating an operation example of the store exit management system 100 according to the first example embodiment. For example, the store exit management system 100 may start the process of FIG. 6 in response to the reader 41 reading the payment completion code.

The code acquisition unit 101 of the store exit management system 100 acquires the payment completion code from the portable terminal 20 via the reader 41 (step S1). The code acquisition unit 101 notifies the paid-for product information acquisition unit 102 of the acquired payment completion code.

The paid-for product information acquisition unit 102 acquires the quantity of the payment completion product associated with the payment completion code (step S2). The paid-for product information acquisition unit 102 notifies the abnormality detection unit 104 of the acquired quantity of the payment completion product.

The estimation unit 103 estimates the quantity of the product to be taken out by the customer from the image obtained by imaging the goods of the customer leaving the store (step S3). The estimation unit 103 notifies the abnormality detection unit 104 of the estimated quantity of the product to be taken out by the customer.

The abnormality detection unit 104 detects an abnormality based on the quantity of the payment completion product and the estimated quantity of the product to be taken out (step S4). The abnormality detection unit 104 notifies the abnormality output unit 105 of the detected abnormality. When no abnormality is detected, the store exit management system 100 terminates the operation.

The abnormality output unit 105 outputs information indicating that an abnormality is detected (step S5). For example, the output of the anomaly causes the store exit management system 100 to terminate operation. The store exit management system 100 appropriately and repeatedly executes the above-described series of operations for each customer, for example.

According to the first example embodiment, when the product is registered and paid for via the portable terminal 20, the code acquisition unit 101 acquires the payment completion code from the portable terminal 20. Then, the paid-for product information acquisition unit 102 acquires the quantity of the payment completion product associated with the payment completion code. The estimation unit 103 estimates the quantity of the product to be taken out by the customer from the image obtained by imaging the goods of the customer leaving the store. Further, the abnormality detection unit 104 detects an abnormality based on the quantity of the payment completion product and the estimated quantity of the product to be taken out. Then, the abnormality output unit 105 outputs information indicating that an abnormality has been detected. Therefore, according to the first example embodiment, it is possible to support the handling of the abnormality related to the product to be taken out by the customer who leaves the store when the product is registered and paid for via the portable terminal operated by the customer.

Second Example Embodiment

Figure 7:
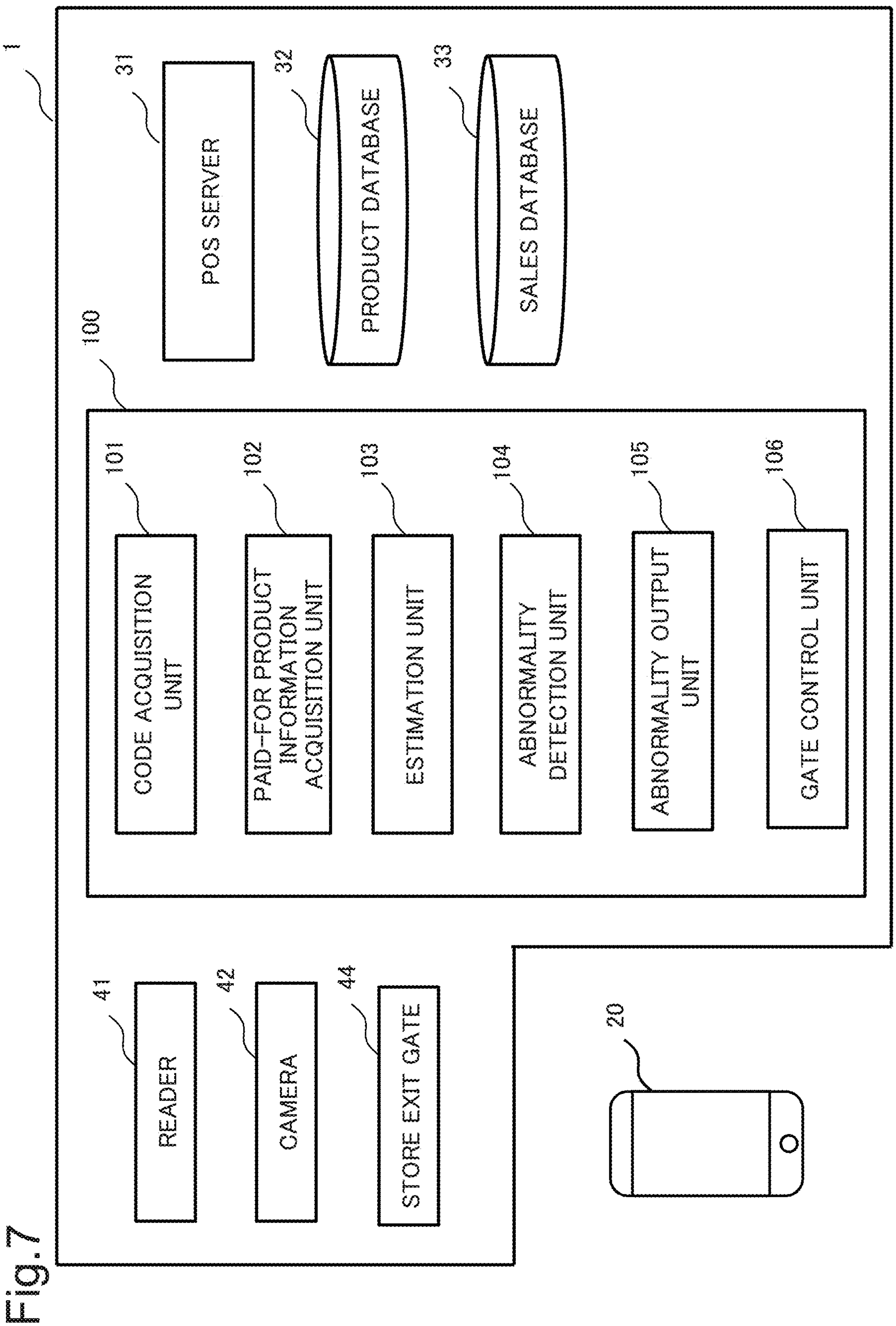
FIG. 7 is a block diagram illustrating a configuration example of a store system according to the second example embodiment.

Next, as the second example embodiment, another example of the store system 1 including the store exit management system 100 will be described. The configuration of the second example embodiment is similar to part of the configuration of the first example embodiment. Therefore, description of the similar configuration is omitted. FIG. 7 is a block diagram illustrating a configuration example of the store system 1 according to the second example embodiment.

The store exit management system 100 according to the second example embodiment is different from the store exit management system 100 according to the first example embodiment in that a gate control unit 106 is included.

In the second example embodiment, the store system 1 further includes a store exit gate 44. The store exit management system 100 is communicatively connected to the store exit gate 44.

An installation example of the store exit gate 44 is as illustrated in FIG. 3. However, an installation example of the store exit gate 44 is not limited to this example.

The gate control unit 106 controls whether to make the store exit gate 44 passable. For example, the gate control unit 106 may control opening and closing of the store exit gate 44. The gate control unit 106 may open the store exit gate 44 in such a way that the customer can pass through, and close the store exit gate 44 in such a way that the customer is not allowed to pass through.

In a case where an abnormality is detected, the gate control unit 106 may make the store exit gate 44 impassable. For example, the abnormality output unit 105 outputs information indicating that an abnormality is detected to the gate control unit 106. When receiving an output indicating that an abnormality is detected from the abnormality output unit 105, the gate control unit 106 makes the store exit gate 44 impassable.

Figure 8:
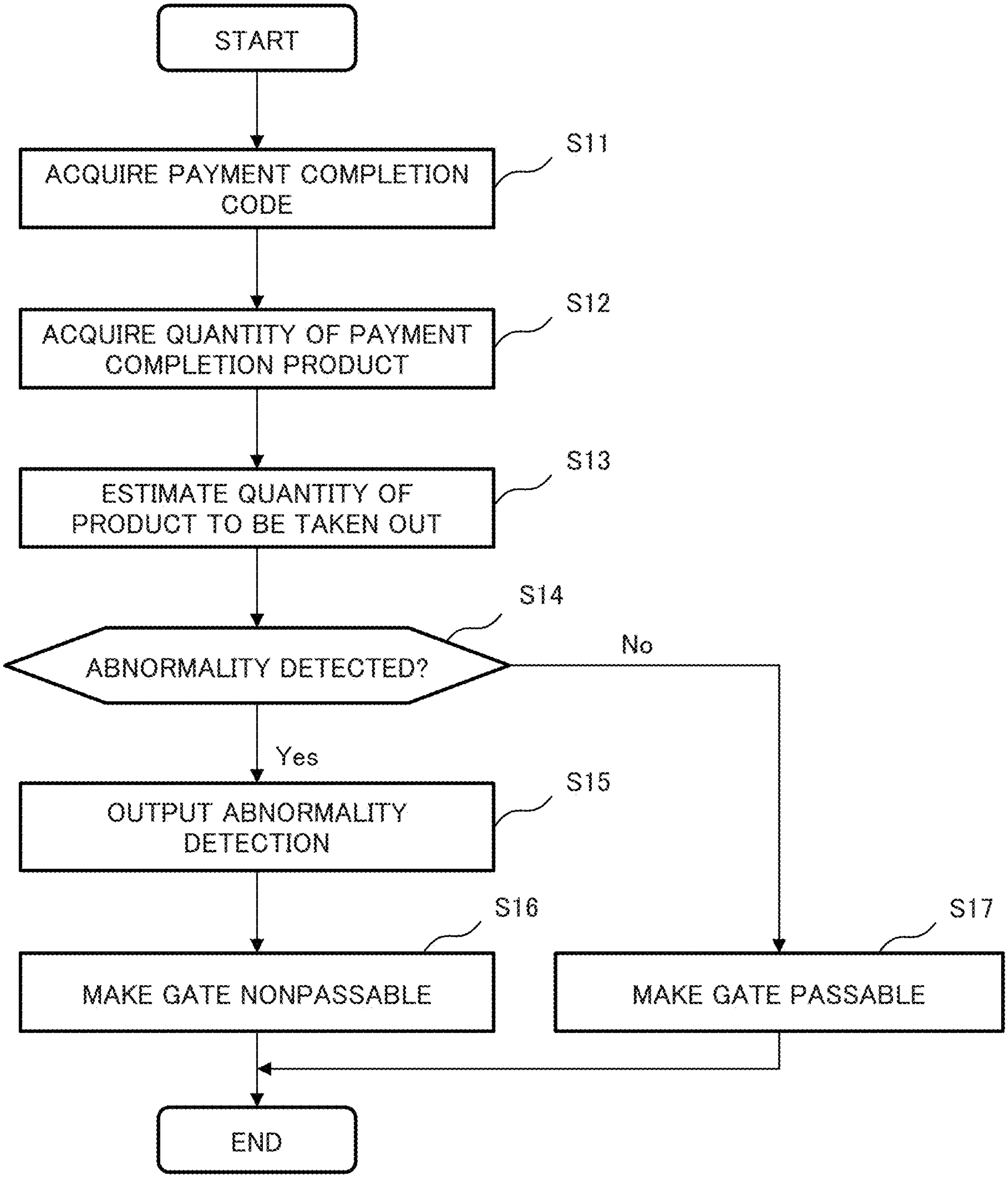
FIG. 8 is a flowchart illustrating an operation example according to the second example embodiment.

Next, an operation of the store exit management system 100 according to the second example embodiment will be described. FIG. 8 is a flowchart illustrating an operation example of the store exit management system 100 according to the second example embodiment. For example, in response to the reader 41 installed at the store exit gate 44 reading the payment completion code, the store exit management system 100 may start the process of FIG. 8.

The code acquisition unit 101 of the store exit management system 100 acquires the payment completion code from the portable terminal 20 via the reader 41 (step S11).

The code acquisition unit 101 notifies the paid-for product information acquisition unit 102 of the acquired payment completion code.

The paid-for product information acquisition unit 102 acquires the quantity of the payment completion product associated with the payment completion code (step S12). The paid-for product information acquisition unit 102 notifies the abnormality detection unit 104 of the acquired quantity of the payment completion product.

The estimation unit 103 estimates the quantity of the product to be taken out by the customer from the image obtained by imaging the goods of the customer leaving the store (step S13). The estimation unit 103 notifies the abnormality detection unit 104 of the estimated quantity of the product to be taken out by the customer.

The abnormality detection unit 104 detects an abnormality based on the quantity of the payment completion product and the estimated quantity of the product to be taken out. When an abnormality is detected (step S14; Yes), the abnormality detection unit 104 notifies the abnormality output unit 105 of the detected abnormality.

Abnormality output unit 105 outputs the detection of the abnormality to the gate control unit 106 (step S15). In response to the output information indicating that the abnormality is detected, the gate control unit 106 makes the store exit gate 44 impassable (step S16).

When no abnormality is detected (step S14; No), the abnormality detection unit 104 outputs to the gate control unit 106 that there is no abnormality. In response to the output indicating that there is no abnormality, the gate control unit 106 makes the store exit gate 44 passable (step S17).

For example, under the control of the gate by the gate control unit 106, the store exit management system 100 terminates the operation.

According to the second example embodiment, when an abnormality is detected, the gate control unit 106 makes the store exit gate 44 impassable. Therefore, according to the second example embodiment, it is possible to cause the customer not to leave the store when there is an abnormality related to the product to be taken out.

Third Example Embodiment

Figure 9:
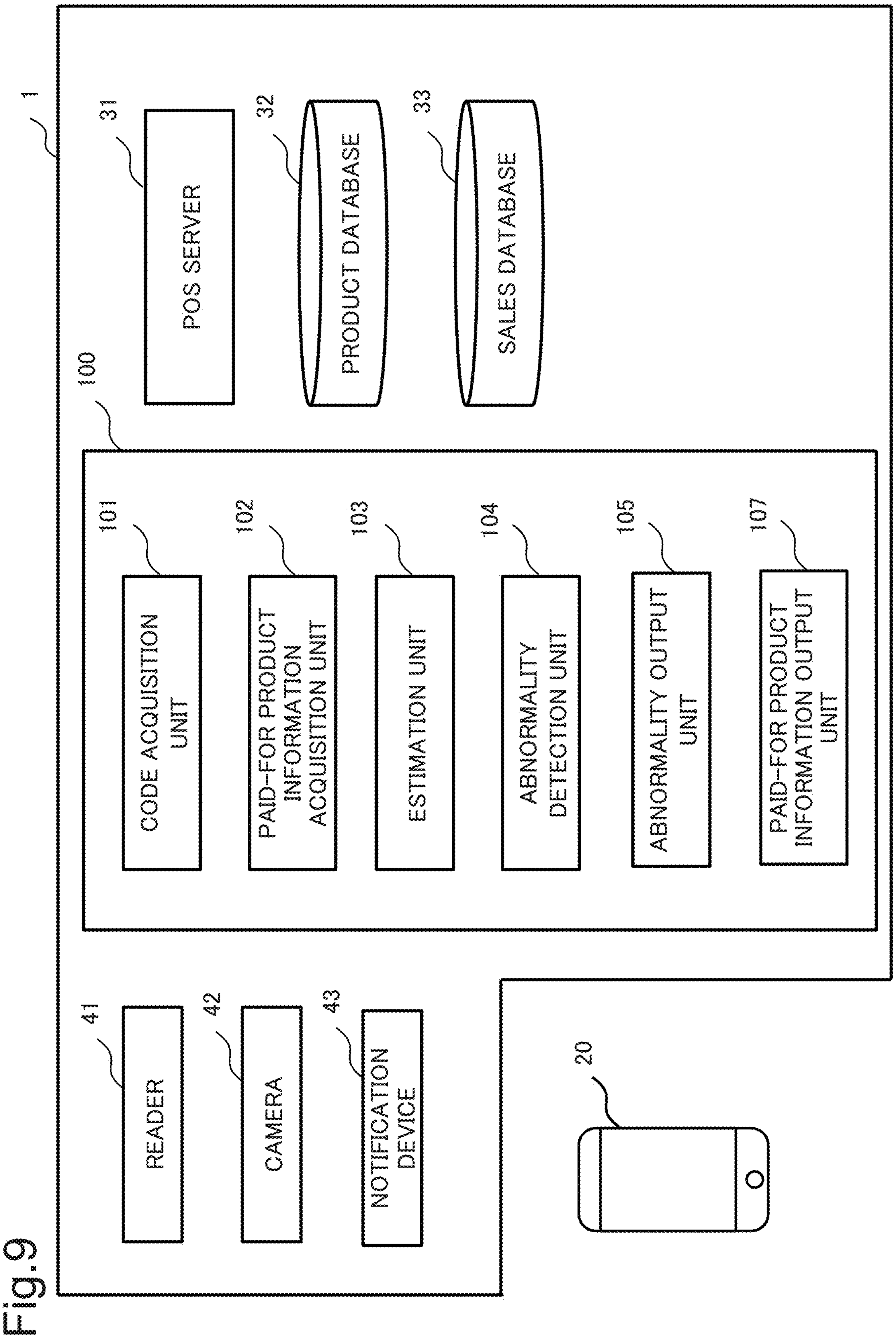
FIG. 9 is a block diagram illustrating a configuration example of a store system according to the third example embodiment.

Next, as the third example embodiment, still another example of the store system 1 including the store exit management system 100 will be described. The configuration of the third example embodiment is similar to part of the configuration of the first example embodiment. Therefore, description of the similar configuration is omitted. FIG. 9 is a block diagram illustrating a configuration of the store system 1 according to the third example embodiment.

The store exit management system 100 according to the third example embodiment is different from the store exit management system 100 according to the first example embodiment in that a paid-for product information output unit 107 is included. The store system 1 according to the third example embodiment includes the notification device 43.

The paid-for product information output unit 107 outputs the number of payment completion products to the notification device 43 according to the acquisition of the payment completion code. In the third example embodiment, the paid-for product information output unit 107 causes the notification device 43 to make a notification of the number of payment completion products regardless of whether an abnormality is detected.

The paid-for product information output unit 107 acquires the number of payment completion products from, for example, the paid-for product information acquisition unit 102. Then, the paid-for product information output unit 107 outputs the acquired number of payment completion products to the notification device 43.

In the third example embodiment, the notification device 43 makes a notification of the number of payment completion products output to the notification device The notification device 43 is, for example, a display or a speaker. As in the first example embodiment, the notification device 43 makes a notification of the abnormality detected by the store exit management system 100.

The notification device 43 may notify the customer of the number of payment completion products. As a result, it is possible to indicate to the customer leaving the store that the number of payment completion products is known. Therefore, it is expected to prevent the customer from leaving the store without paying for some products.

The notification device 43 may notify the clerk of the number of payment completion products. As a result, the store clerk can check whether there is a difference from the number of payment completion products by looking at the quantity of the product to be taken out by the customer leaving the store. That is, double check of detection of an abnormality by the store exit management system 100 and confirmation of the abnormality by the store clerk is achieved.

Instead of the number of payment completion products, other information related to the payment completion product may be used and notified.

Figure 10:
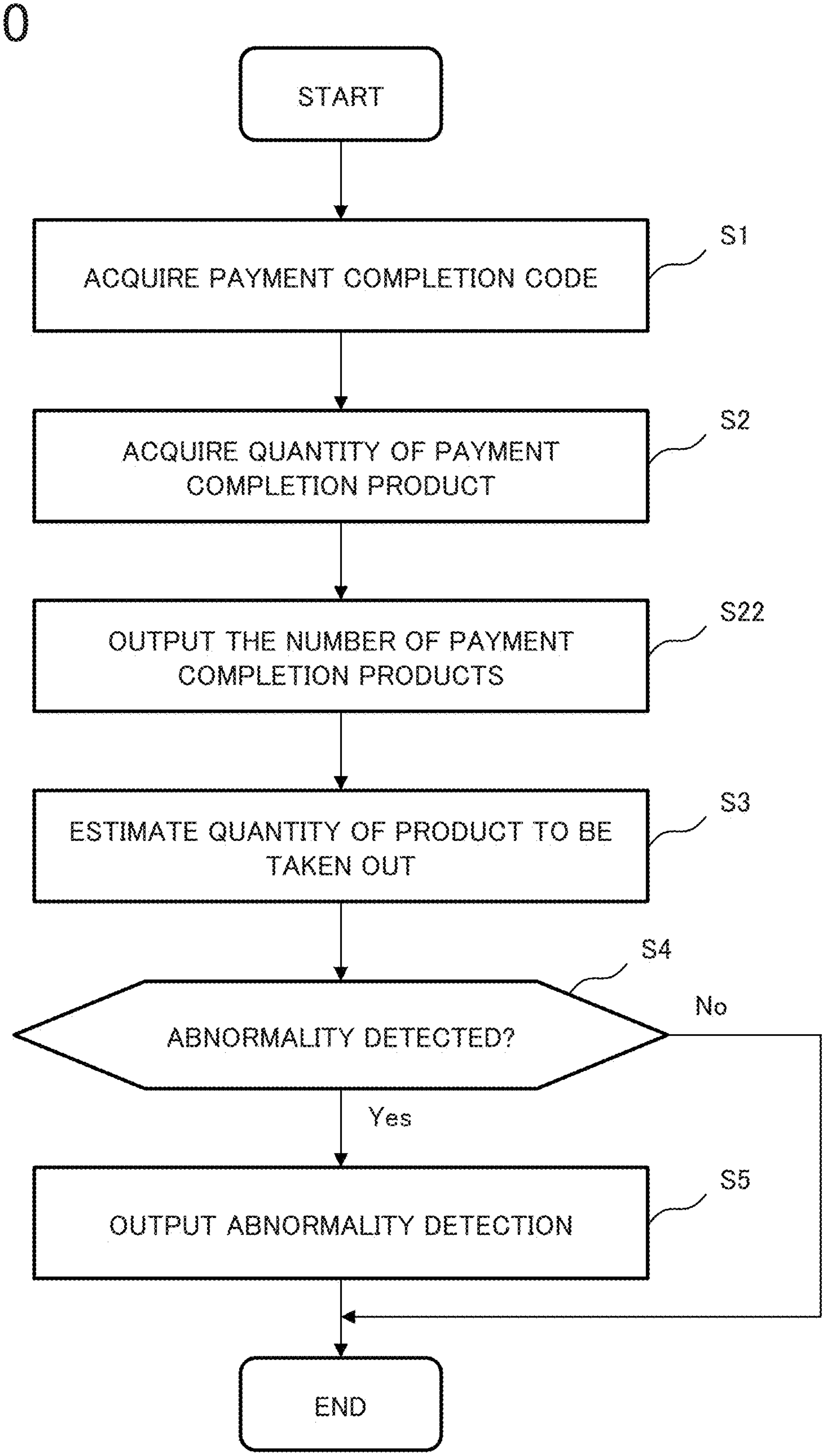
FIG. 10 is a flowchart illustrating an operation example according to the third example embodiment.

FIG. 10 is a flowchart illustrating an operation example of the store exit management system 100 according to the third example embodiment. For example, the store exit management system 100 may start the process of FIG. 10 in response to the reader 41 reading the payment completion code.

The flowchart of FIG. 10 includes the basic operation of the store exit management system 100 in the flowchart of FIG. 6 according to the first example embodiment. Therefore, portions of the flowchart of FIG. 10 different from those of the flowchart of FIG. 6 will be described.

In step S2, for example, the paid-for product information acquisition unit 102 notifies the paid-for product information output unit 107 of the number of payment completion products in the quantity of the payment completion product.

After step S2, the paid-for product information output unit 107 outputs the number of payment completion products to the notification device 43 (step S22). The notification device 43 receives the output and makes a notification of the number of payment completion products.

The operation after step S22 is as described with respect to FIG. 6. When no abnormality is detected (step S4; No), the store exit management system 100 terminates the operation.

The timing at which step S22 is executed is not particularly limited as long as it is after step S2. For example, step S22 may be executed after an abnormality is detected in step S4. In this case, the paid-for product information output unit 107 may acquire the number of payment completion products from the abnormality detection unit 104.

The timing at which the notification device 43 makes a notification of the number of payment completion products is not particularly limited. For example, the notification device 43 may make a notification of the number of payment completion products simultaneously with the notification that the abnormality is detected.

According to the third example embodiment, the paid-for product information output unit 107 outputs the number of payment completion products to the notification device 43 according to the acquisition of the payment completion code. Then, the notification device 43 makes a notification of the number of payment completion products. Therefore, according to the third example embodiment, for example, it is possible to suppress an abnormality related to the product to be taken out by a customer who leaves the store. According to the third example embodiment, for example, it is possible to look at the quantity of the product to be taken out by the customer leaving the store and to support confirmation by the clerk as to whether there is a difference from the number of payment completion products.

Modifications

The above example embodiment may be modified and used. The store exit management system 100 can be applied to a case where there is one customer or a case where the customer is a group including a plurality of customers. When the customer is a group, respective customers belonging to the group are associated with one payment completion code. Then, the estimation unit 103 can estimate the total quantity of the products to be taken out by the group from the image obtained by imaging goods of each customer. According to the present modification, even in a case where a representative of a group makes a payment and a plurality of customers cooperatively take out the product, it is possible to detect an abnormality related to the product to be taken out.

Hardware Configuration

In each of the above-described example embodiments, each component of the store exit management system 100 represents a block of functional units. Some or all of the components of the store exit management system 100 may be achieved by an any combination of the computer 500 and a program.

Figure 11:
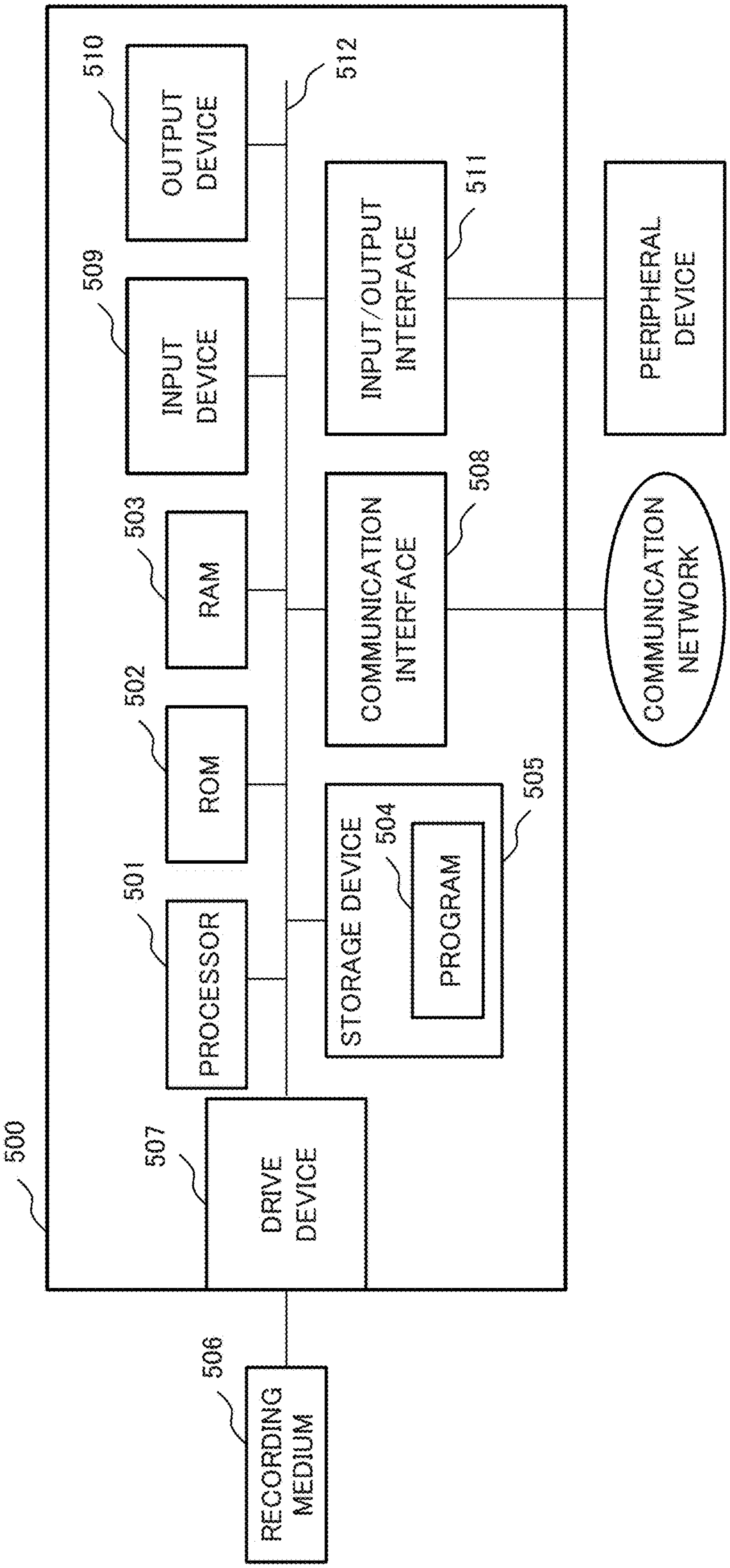
FIG. 11 is a block diagram illustrating an example of a hardware configuration of a computer.

FIG. 11 is a block diagram illustrating an example of a hardware configuration of the computer 500. Referring to FIG. 11, the computer 500 includes, for example, a processor 501, a read only memory (ROM) 502, a random access memory (RAM) 503, a program 504, a storage device 505, a drive device 507, a communication interface 508, an input device 509, an input/output interface 511, and a bus 512.

The program 504 includes an instruction for implementing each function of the store exit management system 100. The program 504 is stored in advance in the ROM 502, the RAM 503, and the storage device 505. The processor 501 implements each function of the store exit management system 100 by executing instructions included in the program 504. The RAM 503 may store data to be processed by each function of the store exit management system 100. The number of read only memories (ROMs) 502, random access memories (RAMs) 503, and storage devices 505 is not particularly limited, and is one or more.

The processor 501 controls the entire computer 500. Examples of the processor 501 include a central processing unit (CPU) and the like. The number of processors 501 is not particularly limited, and the number of processors 501 is one or more.

The drive device 507 reads and writes the recording medium 506. The communication interface 508 provides an interface with a communication network. The input device 509 is, for example, a mouse, a keyboard, or the like, and receives an input of information from an administrator or the like of the store. The output device 510 is, for example, a display, to output (displays) information to an administrator or the like of the store. The input/output interface 511 provides an interface with a peripheral device. The bus 512 connects the components of the hardware. The program 504 may be supplied to the CPU 501 via a communication network, or may be stored in the recording medium 506 in advance, read by the drive device 507, and supplied to the CPU 501.

The hardware configuration illustrated in FIG. 11 is an example, and other components may be added or some components may not be included.

There are various modifications of the method of achieving the store exit management system 100. For example, the store exit management system 100 may be achieved by any combinations of a computer and a program different for each component. A plurality of components included in the store exit management system 100 may be achieved by any combinations of one computer and a program.

Although the present disclosure is described with reference to the exemplary example embodiments, the present disclosure is not limited to the exemplary example embodiments. Various modifications that can be understood by those of ordinary skill in the art can be made to the configuration and details of the present disclosure within the scope of the present disclosure. The configurations in the respective example embodiments can be combined with each other without departing from the scope of the present disclosure.

Some or all of the above example embodiments may be described as the following Supplementary Notes, but are not limited to the following.

Supplementary Note 1

A store exit management system including a code acquisition means for acquiring a payment completion code from a portable terminal operated by a customer when a product was registered and paid for through the portable terminal, a paid-for product information acquisition means for acquiring a quantity of a payment completion product associated with the payment completion code, an estimation means for estimating, from an image obtained by imaging goods of the customer leaving a store, a quantity of a product to be taken out by the customer, an abnormality detection means for detecting an abnormality based on the acquired quantity of the payment completion product and the estimated quantity of the product to be taken out, and an abnormality output means for outputting information indicating that the abnormality is detected.

Supplementary Note 2

The store exit management system according to Supplementary Note 1, wherein the abnormality detection means detects the abnormality based on a difference between the estimated quantity of the product to be taken out and the quantity of the payment completion product.

Supplementary Note 3

The store exit management system according to Supplementary Note 2, wherein the abnormality detection means detects the abnormality in a case where a difference between the estimated quantity of the product to be taken out and the quantity of the payment completion product exceeds a threshold value.

Supplementary Note 4

The store exit management system according to any one of Supplementary Notes 1 to 3, wherein the abnormality detection means detects the abnormality in a case where the estimated quantity of the product to be taken out is larger than the quantity of the payment completion product.

Supplementary Note 5

The store exit management system according to any one of Supplementary Notes 1 to 4, wherein the abnormality detection means detects the abnormality in a case where the estimated quantity of the product to be taken out is smaller than the quantity of the payment completion product.

Supplementary Note 6

The store exit management system according to any one of Supplementary Notes 1 to 5, wherein the quantity of the payment completion product is a volume of the payment completion product, and the quantity of the product to be taken out is a volume of the product to be taken out.

Supplementary Note 7

The store exit management system according to any one of Supplementary Notes 1 to 6, wherein the quantity of the payment completion product is the number of the payment completion products, and the quantity of the product to be taken out is the number of the products to be taken out.

Supplementary Note 8

The store exit management system according to any one of Supplementary Notes 1 to 7, wherein the estimation means estimates the quantity of the product to be taken out from the image obtained by imaging the goods of the customer leaving the store and an image obtained by imaging goods of the customer before holding the product to be taken out.

Supplementary Note 9

The store exit management system according to any one of Supplementary Notes 1 to 8, further including a gate control means for controlling a store exit gate through which the customer leaving the store passes, wherein in a case where the abnormality is detected, the gate control means makes the store exit gate impassable.

Supplementary Note 10

The store exit management system according to any one of Supplementary Notes 1 to 9, further including a paid-for product information output means for outputting the number of the payment completion products to a notification device in response to acquisition of the payment completion code.

Supplementary Note 11

A store exit management method including acquiring a payment completion code from a portable terminal operated by a customer when a product was registered and paid for through the portable terminal, acquiring a quantity of a payment completion product associated with the payment completion code, estimating, from an image obtained by imaging goods of the customer leaving a store, a quantity of a product to be taken out by the customer, detecting an abnormality based on the acquired quantity of the payment completion product and the estimated quantity of the product to be taken out, and outputting information indicating that the abnormality is detected.

Supplementary Note 12

A recording medium that non-transiently records a program for causing a computer to execute the steps of acquiring a payment completion code from a portable terminal operated by a customer when a product was registered and paid for through the portable terminal, acquiring a quantity of a payment completion product associated with the payment completion code, estimating, from an image obtained by imaging goods of the customer leaving a store, a quantity of a product to be taken out by the customer, detecting an abnormality based on the acquired quantity of the payment completion product and the estimated quantity of the product to be taken out, and outputting information indicating that the abnormality is detected.

REFERENCE SIGNS LIST

1 store system
100 store exit management system
101 code acquisition unit
102 paid-for product information acquisition unit
103 estimation unit
104 abnormality detection unit
105 abnormality output unit
106 gate control unit
107 paid-for product information output unit
20 portable terminal
21 processing unit
22 storage unit
31 POS server
32 product database
33 sales database
34 detection abnormality database
41 reader
42 camera
43 notification device

44 store exit gate
C1 customer
C2 goods

What is claimed is:

1. A store exit management system comprising:

at least one memory configured to store instructions; and at least one processor configured to execute the instructions to:

acquire a payment completion code from a portable terminal operated by a customer when a product was registered and paid for through the portable terminal;

acquire a quantity of a payment completion product associated with the payment completion code;

estimate, from an image obtained by imaging goods of the customer leaving a store, a quantity of a product to be taken out by the customer;

detect an abnormality based on the acquired quantity of the payment completion product and the estimated quantity of the product to be taken out, wherein the abnormality is detected in a case where a difference between the estimated quantity of the product to be taken out and the quantity of the payment completion product exceeds a threshold value;

adjust the threshold value in accordance with estimation accuracy of the quantity of the product to be taken out, such that the threshold value increases as the estimation accuracy decreases, to prevent false abnormality detection;

based on the abnormality being detected, determine a notification level based on the difference between the estimated quantity of the product to be taken out and the quantity of the payment completion product; and output a notification indicating that the abnormality is detected at the determined notification level.

2. The store exit management system according to claim 1, wherein the at least one processor is further configured to execute the instructions to:

detect the abnormality in a case where the estimated quantity of the product to be taken out is larger than the quantity of the payment completion product.

3. The store exit management system according to claim 1, wherein the at least one processor is further configured to execute the instructions to:

detect the abnormality in a case where the estimated quantity of the product to be taken out is smaller than the quantity of the payment completion product.

4. The store exit management system according to claim 1, wherein the quantity of the payment completion product is a volume of the payment completion product, and the quantity of the product to be taken out is a volume of the product to be taken out.

5. The store exit management system according to claim 1, wherein the quantity of the payment completion product is a number of the payment completion products, and the quantity of the product to be taken out is a number of the products to be taken out.

6. The store exit management system according to claim 1, wherein the at least one processor is further configured to execute the instructions to:

estimate the quantity of the product to be taken out from the image obtained by imaging the goods of the customer leaving the store and an image obtained by imaging goods of the customer before holding the product to be taken out.

7. The store exit management system according to claim 6, wherein the at least one processor is further configured to execute the instructions to:

estimate the quantity of the product to be taken out by:

acquiring an image obtained by imaging personal belongings brought by the customer when entering the store before holding the product to be taken out;

acquiring the image obtained by imaging goods of the customer leaving the store; and comparing the acquired images to distinguish between personal belongings and the product to be taken out.

8. The store exit management system according to claim 1, wherein the at least one processor is further configured to execute the instructions to:

control a store exit gate through which the customer leaving the store passes to make the store exit gate impassable in a case where the abnormality is detected.

9. The store exit management system according to claim 1, wherein the at least one processor is further configured to execute the instructions to:

output a number of the payment completion products to a notification device in response to acquisition of the payment completion code.

10. The store exit management system according to claim 1, wherein the at least one processor is further configured to execute the instructions to:

determine a first notification level if the difference is smaller than a predetermined value; and determine a second notification level higher than the first notification level if the difference is equal to or larger than the predetermined value.

11. The store exit management system according to claim 1, wherein the at least one processor is further configured to execute the instructions to:

output the notification in different colors based on the determined notification level.

12. The store exit management system according to claim 1, wherein the at least one processor is further configured to execute the instructions to:

adjust the threshold value using a past abnormality detection history of the customer.

13. The store exit management system according to claim 1, wherein the at least one processor is further configured to execute the instructions to:

determine that the abnormality corresponds to unauthorized taking out of unpaid products in a case where the estimated quantity of the product to be taken out is larger than the quantity of the payment completion products;

determine that the abnormality corresponds to leaving behind of paid products in a case where the estimated quantity of the product to be taken out is smaller than the quantity of the payment completion products; and output the notification to different notification devices based on the determination.

14. The store exit management system according to claim 13, wherein the at least one processor is further configured to execute the instructions to:

output the notification to a notification device for store staff in a case where the estimated quantity of the product to be taken out is larger than the quantity of the payment completion product; and output the notification to a notification device for the customer in a case where the estimated quantity of the product to be taken out is smaller than the quantity of the payment completion product.

15. The store exit management system according to claim 1, wherein the at least one processor is further configured to execute the instructions to:

adjust the threshold value in accordance with a congestion level of the store such that the threshold value increases as the congestion level increases, to reduce frequency of abnormality detection.

16. The store exit management system according to claim 1, wherein the at least one processor is further configured to execute the instructions to:

adjust the threshold value in accordance with a congestion level of the store such that the threshold value decreases as the congestion level increases, to enhance abnormality detection.

17. A store exit management method comprising:

acquiring a payment completion code from a portable terminal operated by a customer when a product was registered and paid for through the portable terminal;

acquiring a quantity of a payment completion product associated with the payment completion code;

estimating, from an image obtained by imaging goods of the customer leaving a store, a quantity of a product to be taken out by the customer;

detecting an abnormality based on the acquired quantity of the payment completion product and the estimated quantity of the product to be taken out, wherein the abnormality is detected in a case where a difference between the estimated quantity of the product to be taken out and the quantity of the payment completion product exceeds a threshold value;

adjusting the threshold value in accordance with estimation accuracy of the quantity of the product to be taken out, such that the threshold value increases as the estimation accuracy decreases, to prevent false abnormality detection;

based on the abnormality being detected, determining a notification level based on the difference between the estimated quantity of the product to be taken out and the quantity of the payment completion product; and outputting a notification indicating that the abnormality is detected at the determined notification level.

18. A recording medium that non-transiently records a program for causing a computer to execute the steps of:

acquiring a payment completion code from a portable terminal operated by a customer when a product was registered and paid for through the portable terminal;

acquiring a quantity of a payment completion product associated with the payment completion code;

estimating, from an image obtained by imaging goods of the customer leaving a store, a quantity of a product to be taken out by the customer;

detecting an abnormality based on the acquired quantity of the payment completion product and the estimated quantity of the product to be taken out, wherein the abnormality is detected in a case where a difference between the estimated quantity of the product to be taken out and the quantity of the payment completion product exceeds a threshold value;

adjusting the threshold value in accordance with estimation accuracy of the quantity of the product to be taken out, such that the threshold value increases as the estimation accuracy decreases, to prevent false abnormality detection;

based on the abnormality being detected, determining a notification level based on the difference between the estimated quantity of the product to be taken out and the quantity of the payment completion product; and outputting a notification indicating that the abnormality is detected at the determined notification level.

* * * * *